US010665410B2

(12) United States Patent
Ren et al.

(10) Patent No.: US 10,665,410 B2
(45) Date of Patent: May 26, 2020

(54) CIRCUIT BREAKER INCLUDING ACTIVE ARC CONTROL FEATURES

(71) Applicant: ABB Schweiz AG, Baden (CH)

(72) Inventors: Xuhui Ren, Shanghai (CN); Hao Wu, Shanghai (CN); Wei Wang, Shanghai (CN)

(73) Assignee: ABB Schweiz AG, Baden (CH)

( * ) Notice: Subject to any disclaimer, the term of this patent is extended or adjusted under 35 U.S.C. 154(b) by 5 days.

(21) Appl. No.: 15/985,741

(22) Filed: May 22, 2018

(65) Prior Publication Data

US 2019/0287750 A1 Sep. 19, 2019

(30) Foreign Application Priority Data

Jul. 7, 2017 (CN) .......................... 2017 1 0551224

(51) Int. Cl.
*H01H 71/12* (2006.01)
*H01H 83/00* (2006.01)
*H02B 13/035* (2006.01)

(52) U.S. Cl.
CPC ............ *H01H 71/12* (2013.01); *H01H 83/00* (2013.01); *H02B 13/0354* (2013.01)

(58) Field of Classification Search
CPC .......... H01H 71/12; H01H 9/30; H01H 11/00; H01H 83/00; H01H 9/342; H02B 11/02; H02B 1/565; H02B 13/0354; H02B 13/025
USPC ........ 218/139, 120, 134, 140, 155, 156, 157
See application file for complete search history.

(56) References Cited

U.S. PATENT DOCUMENTS

| 5,055,640 A * | 10/1991 | Lippi | H01H 33/666 218/120 |
|---|---|---|---|
| 5,434,369 A * | 7/1995 | Tempco | H02B 11/02 200/50.26 |
| 6,326,872 B1 * | 12/2001 | Marchand | H01H 9/12 218/139 |
| 6,396,018 B1 * | 5/2002 | Kinoshita | C10M 169/00 218/120 |
| 2013/0240485 A1 * | 9/2013 | Yabu | H02B 13/0354 218/139 |
| 2014/0138357 A1 * | 5/2014 | Kasza | H01H 11/00 218/134 |
| 2015/0270075 A1 * | 9/2015 | Das | H01H 9/342 218/149 |

(Continued)

*Primary Examiner* — Edwin A. Leon
*Assistant Examiner* — William A Bolton
(74) *Attorney, Agent, or Firm* — Barnes & Thornburg LLP

(57) ABSTRACT

A circuit breaker includes an interrupter configured to selectively prevent a flow of electrical current through the circuit breaker, and an assembly. The assembly includes a housing, an interrupter mechanism, and an arc protection mechanism. The housing includes an opening configured to channel an arc fault discharge generated during an arc fault into the housing. The interrupter mechanism is coupled to the housing and the interrupter, and is configured to move the interrupter between a first position and a second position, wherein the first position prevents a flow of electrical current through the circuit breaker and the second position permits a flow of electrical current through the circuit breaker. The arc protection mechanism is within the housing and is configured to receive the arc fault discharge through the housing and to cause the interrupter to move to the first position in response to the arc fault discharge.

20 Claims, 6 Drawing Sheets

(56) References Cited

U.S. PATENT DOCUMENTS

2016/0043532 A1* 2/2016 Zende ................. H02B 13/025
361/611

* cited by examiner

CIRCUIT BREAKER INCLUDING ACTIVE ARC CONTROL FEATURES

CROSS-REFERENCE TO RELATED APPLICATION

This application claims priority to Chinese Patent Application No. 201710551224.5, filed Jul. 7, 2017.

BACKGROUND

The field of the disclosure relates generally to circuit breakers and, more particularly, to circuit breakers including active arc control features that do not require a triggering circuit or electrical input.

In known electrical switchgear, electrical arcs have the potential to release a very large quantum of energy in a very short period of time. Such arc faults may render switchgear and associated equipment unusable. Known devices and methods for controlling arc energy in switchgear include passive and active systems. Passive systems typically provide increased protection through strengthened enclosures and venting of arc fault discharge. Active devices and methods for arc energy control aim to lessen the time or the magnitude of the arc current to control the arc flash energy. Such known active devices (e.g., circuit breakers) and methods seek to lessen the time the arc exists in the switchgear, either by quenching the arc or transporting the arc to an alternative location.

At least some known circuit breaker devices are used to protect, in a residential, industrial, utility, or commercial environment, against overcurrent conditions, ground fault conditions, or other system anomalies that are undesirable and require the circuit breaker to interrupt the flow of current through the circuit breaker. Known active circuit breaker devices lessen the time the arc exists by interrupting the flow of current through the circuit breaker by using a triggering circuit that requires electrical power to function. These circuits may add a substantial amount of complexity and cost to such circuit breaker devices. Further, in at least some known active circuit breaker devices and methods, limits on the speed of response to an arc flash condition limits the internal arc classification (IAC) of low-, medium-, and high-voltage switchgear in both direct current (DC) and alternating current (AC) power systems applications.

BRIEF DESCRIPTION

In one aspect, a circuit breaker for an arc protection system is provided. The circuit breaker includes an interrupter configured to selectively prevent a flow of electrical current through the circuit breaker, and an assembly. The assembly includes a housing including an opening, an interrupter mechanism, and an arc protection mechanism. The interrupter mechanism is coupled to the housing and the interrupter, the interrupter mechanism configured to move the interrupter between a first position and a second position, wherein the first position prevents a flow of electrical current through the circuit breaker and the second position permits a flow of electrical current through the circuit breaker. The arc protection mechanism is within the housing, wherein the housing opening is positioned to allow an arc fault discharge generated during an arc fault to pass into the housing and to the arc protection mechanism, wherein the arc protection mechanism is configured to cause the interrupter to move to the first position in response to the arc fault discharge.

In another aspect, an arc protection system for an electrical enclosure is provided. The electrical enclosure includes a breaker compartment and a cable compartment. The arc protection system includes a load side power line coupled to at least one electrical component, and a line side power line coupled to at least one electrical power source. The arc protection system also includes a circuit breaker including an interrupter and an assembly. The interrupter is configured to selectively prevent a flow of electrical current through the circuit breaker. The assembly includes a housing including an opening, an interrupter mechanism, and an arc protection mechanism. The interrupter mechanism is coupled to the housing and the interrupter, the interrupter mechanism configured to move the interrupter between a first position and a second position, wherein the first position prevents a flow of electrical current through the circuit breaker and the second position permits a flow of electrical current through the circuit breaker. The arc protection mechanism is within the housing, wherein the housing opening is positioned to allow an arc fault discharge generated during an arc fault to pass into the housing and to the arc protection mechanism, wherein the arc protection mechanism is configured to cause the interrupter to move to the first position in response to the arc fault discharge.

In yet another aspect, a method of extinguishing an arc from an arc fault occurring in an interior of an electrical enclosure with a circuit breaker is provided. The method includes channeling an arc fault discharge generated during an arc fault into a housing of the circuit breaker. The method also includes receiving, by an arc protection mechanism within the housing, the arc fault discharge, wherein the arc protection mechanism is configured to receive the arc fault discharge and trip an interrupter mechanism in response. The method further includes moving, by the interrupter mechanism, an interrupter within the housing to a first position, wherein the first position prevents a flow of electrical current through the circuit breaker.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
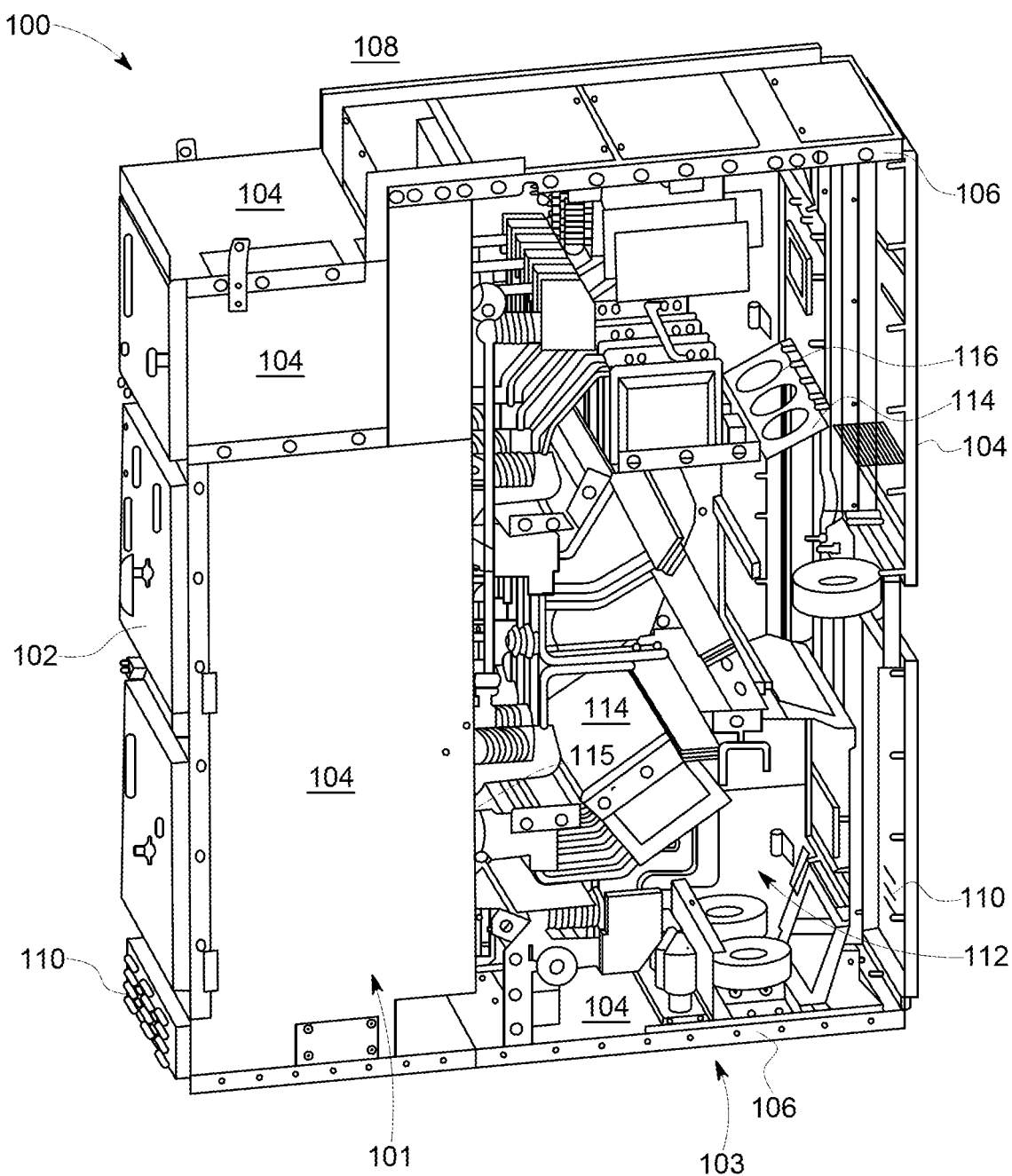
FIG. 1 is a perspective and partial cutaway view of an exemplary embodiment of an electrical enclosure including an arc protection system.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Exemplary embodiments of circuit breakers and methods of using circuit breakers are described herein. Circuit breakers are a type of electrical switch designed to protect an electrical circuit from damage caused by an out of specification electrical current condition, typically resulting from an overload or a short circuit. The circuit breakers described herein generally include an interrupter and an assembly. The assembly includes a housing, an interrupter mechanism, and an arc protection mechanism. The interrupter is configured to prevent a flow of electricity through the circuit breaker when the interrupter is in a first position, and to allow a flow of electrical current through the circuit breaker when the interrupter is in a second position. The housing includes a vent path with an opening that allows an arc fault discharge to enter the housing and directs the arc fault discharge to the arc protection mechanism. The arc protection mechanism is housed within and coupled to the housing, and is triggered when contacted by the incoming arc fault discharge. When the arc protection mechanism is triggered, the interrupter mechanism is activated to move the interrupter between the first position and the second position. In the example embodiments, the circuit breakers described herein are configured to be mechanically triggered to protect componentry within an electrical enclosure without the need for a triggering circuit, or electrical input, and without any potential response delay associated with a triggering circuit.

FIG. 1 is a perspective and partial cutaway view of an exemplary embodiment of an electrical enclosure, for example switchgear enclosure 100. In the exemplary embodiment, switchgear enclosure 100 includes at least one breaker compartment 101 and at least one cable compartment 103. Each breaker compartment includes at least one door 102 which allows access to an interior of switchgear enclosure 100, for example to an arc protection system 105 (shown in FIG. 2). In the exemplary embodiment, arc protection system 105 is configured to facilitate extinguishing an electrical arc generated during an electrical arc fault in breaker compartment 101. An arc fault is a type of electrical explosion or discharge that results from a low-impedance connection through air to a ground or another voltage phase in an electrical system. In the exemplary embodiment, an arc fault discharge includes, but is not limited to, arc blast, arc gasses, plasma, pressure waves, and debris from the arc blast. Arc faults can be the result of many factors related to the electrical equipment and/or personnel procedure failures. As used herein, "arc faults" generally refer to arc events that occur as a result of equipment or personnel failures, and do not refer to arc events that occur during tripping of a circuit breaker. Equipment related arc flash incidents can result from, without limitation, worn or broken conductor insulation, exposed electrical componentry that is part of a live circuit, loose wire connections, improperly maintained switches and circuit breakers, obstructed disconnect panels, water or liquid near electrical equipment, high voltage cables, static electricity, and damaged tools and equipment. Additionally, arc faults can occur in each of breaker compartment 101 and cable compartment 103. Arc protection system 105 functions, at least in part, by directing the flow of at least a portion of the arc fault discharge generated by the arc fault within switchgear enclosure 100.

Switchgear enclosure 100 also includes a plurality of metal or metal-clad exterior panels 104 arranged upon and coupled to a plurality of supportive frame members 106, and which provide structural support and protection from conditions present in an external environment 108 outside switchgear enclosure 100. Also, in the exemplary embodiment, switchgear enclosure 100 includes a plurality of covered vents 110 defined in at least one of one or more doors 102 and one or more exterior panels 104. Covered vents 110 facilitate exchange of air from external environment 108 to/from the interior of switchgear enclosure 100 and further facilitate prevention of accumulation of fumes therein (e.g., during an electrical arc fault within switchgear enclosure 100).

Also, in the exemplary embodiment, interior of switchgear enclosure 100 includes a plurality of electrical components 112 such as electrical lines, switchgear, switches, connectors, and various other devices necessary to connect electrical load devices to main power lines and circuit breakers. Further, in the exemplary embodiment, interior of switchgear enclosure 100 includes one or more interior panels 114. In at least some embodiments, arc protection system 105 includes a deformable portion 115 of at least one interior panel 114 that is configured to deform in response to an arc fault occurring in cable compartment 103. Interior panel 114 may include one or more apertures 116 defined therethrough. Apertures 116 are configured to perform a number of functions in switchgear enclosure 100 including, without limitation, to facilitate ventilation therein and permit connections between individual electrical components 112 of the plurality of electrical components 112 within switchgear enclosure 100.

Figure 2:
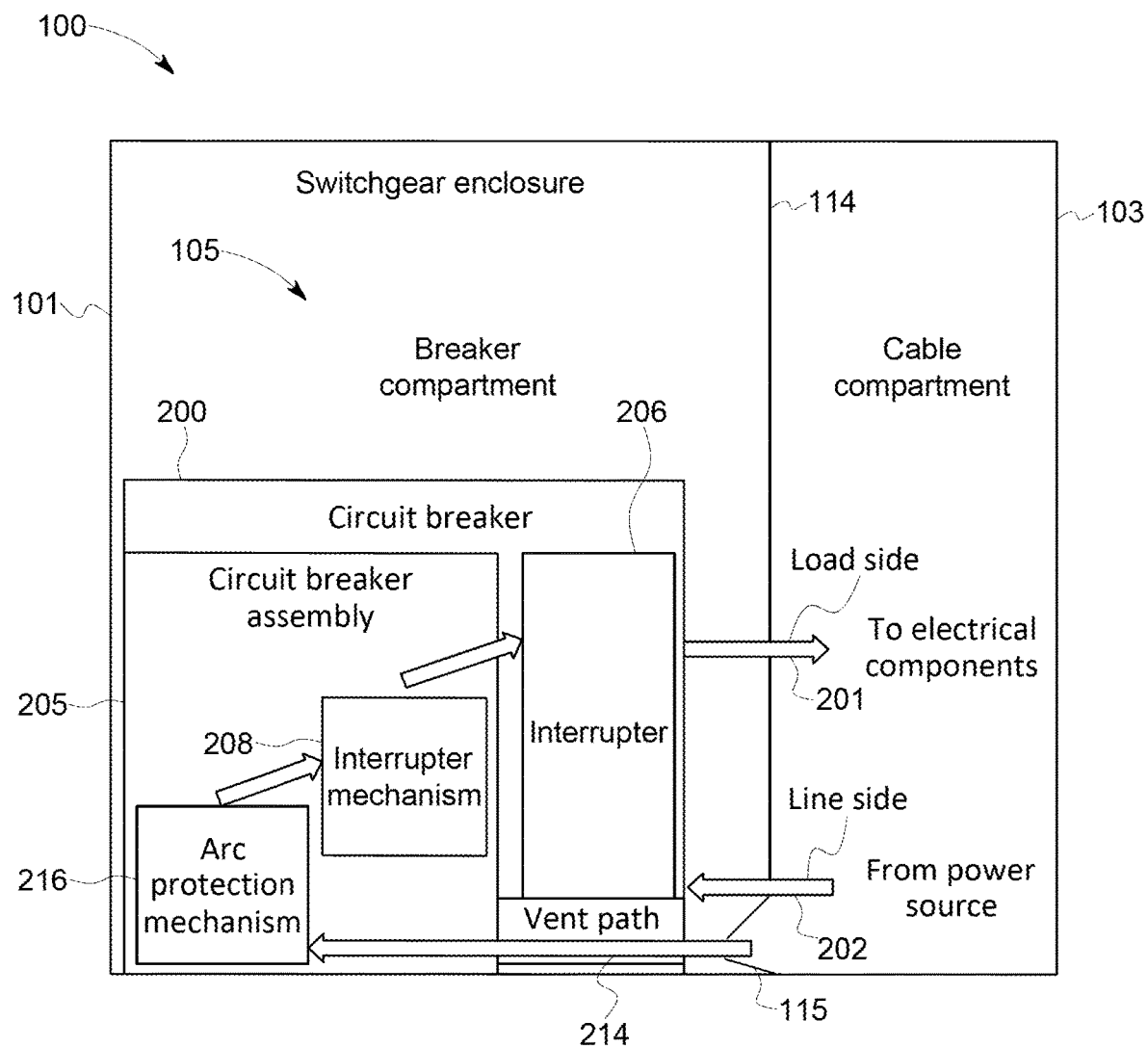
FIG. 2 is a simplified block diagram of an exemplary embodiment of an arc protection system that may be used with the electrical enclosure shown in FIG. 1.

FIG. 2 is a simplified block diagram of an exemplary embodiment of an arc protection system 105 that may be used with switchgear enclosure 100 shown in FIG. 1. In the exemplary embodiment, circuit breaker 200 of arc protection system 105 is a vacuum circuit breaker (i.e., a circuit breaker where an electrical arc is quenched in a vacuum). Alternatively, circuit breaker 200 may be any other type of circuit breaker, including, without limitation, an air circuit breaker, a sulfur hexafluoride circuit breaker, and a carbon dioxide circuit breaker. Circuit breaker 200 is positioned within breaker compartment 101 and is coupled to and between two sets of electrical power lines. The two sets of electrical power lines include at least one load side power line 201 and at least one line side power line 202. Further, in the exemplary embodiment, load side power line 201 is coupled to at least one electrical component 112 within cable compartment 103 of enclosure 100, and line side power line 202 is coupled to at least one electrical power source 204 including, without limitation, an AC power generator or a DC power supply.

In the exemplary embodiment, circuit breaker 200 includes an interrupter 206 and a circuit breaker assembly 205 including an arc protection mechanism 216 and an interrupter mechanism 208 and defining a vent path 214. In alternative embodiments, circuit breaker 200 includes any components that enable circuit breaker 200 to operate as described herein. For example, in some embodiments, circuit breaker 200 includes a load strap (not shown), a line strap (not shown), a rotor assembly (not shown), and an operating mechanism (not shown).

In the exemplary embodiment, deformable portion 115 of interior panel 114 is configured to deform in response to an arc fault discharge generated during an arc fault within cable compartment 103. Specifically, deformable portion 115 includes weakened areas around the perimeter of deformable portion 115 that facilitate at least a portion of deformable portion 115 separating from interior panel 114 such that the arc fault discharge is channeled from cable compartment 103 into breaker compartment 101 and at least partially into vent path 214. In the exemplary embodiment, the arc fault discharge exerts force against deformable portion 115, causing deformable portion 115 to at least partially separate from interior panel 114. Deformable portion 115 is then caused to deform away from the arc fault within cable compartment 103 and towards circuit breaker 200 within breaker compartment 101, while at least at least a portion of deformable portion 115 remains coupled to interior panel 114. The arc fault discharge passes through the opening in interior panel 114 resulting from the deformation of deformable portion 115, the arc fault discharge being at least partially constrained by deformable portion 115 as it enters breaker compartment 101. In alternative embodiments, deformable portion 115 is configured in any manner that enables arc protection system 105 to operate as described herein.

Figure 3:
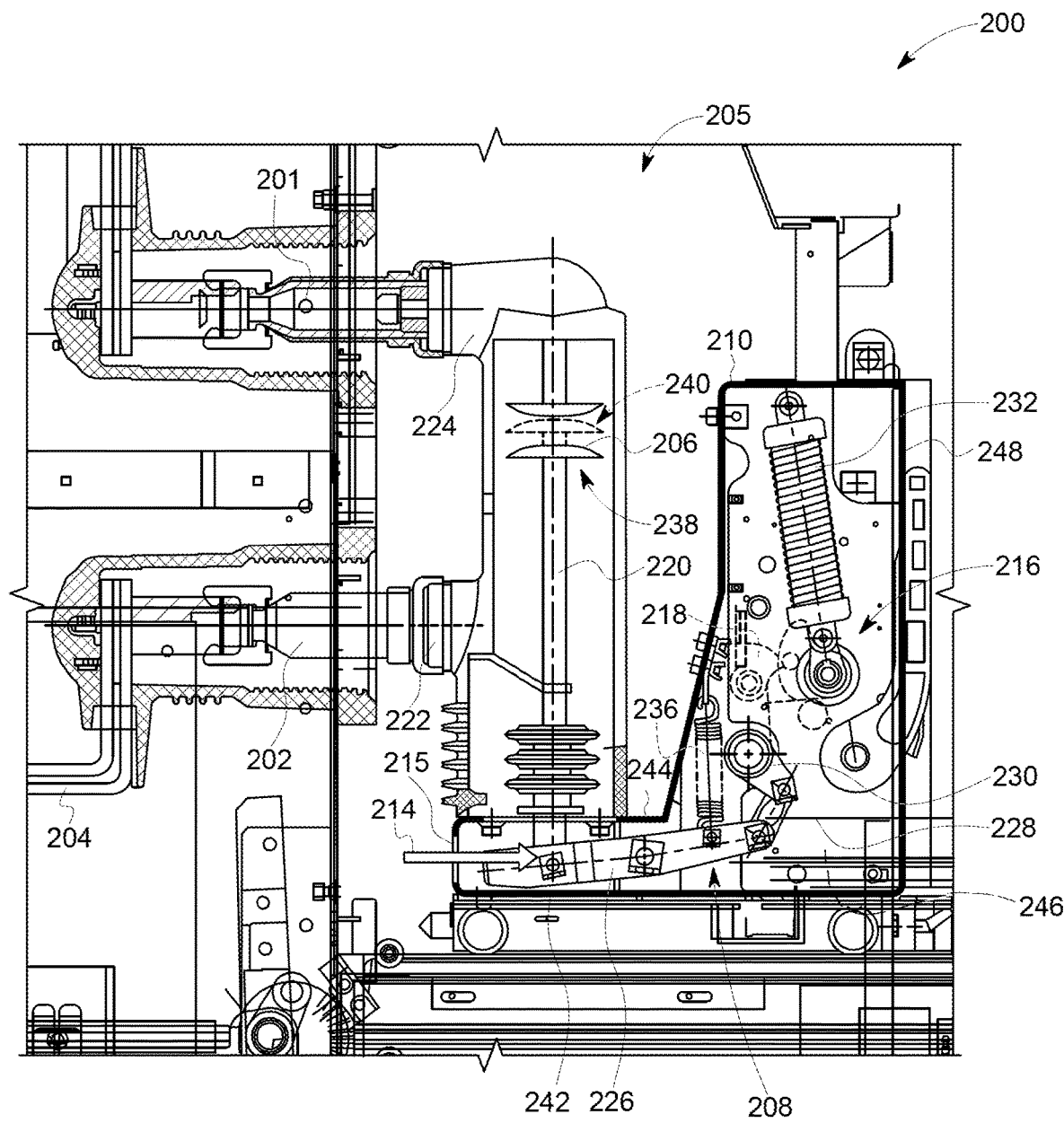
FIG. 3 is a schematic diagram of an exemplary embodiment of a circuit breaker that may be used with the arc protection system shown in FIG. 2.

FIG. 3 is a schematic diagram of an exemplary embodiment of a circuit breaker 200 that may be used with arc protection system 105 shown in FIG. 2. In the exemplary embodiment, circuit breaker assembly 205 includes a housing 210, an interrupter mechanism 208, and an arc protection mechanism 216. Housing 210 defines a vent path 214 formed in housing 210 and including an opening 215 configured to channel at least a portion of the arc fault discharge generated during an arc fault into housing 210. Vent path 214 is defined by a pair of sidewalls 246, a upper wall 244, a lower wall 242 and a back wall 248. An arc fault discharge entering vent path 214 through opening 215 is constrained by sidewalls 246, upper wall 244, and lower wall 242, and is directed to make contact with back wall 248. The arc fault discharge is then redirected by back wall 248 towards arc protection mechanism 216. In alternative embodiments, vent path 214 is configured to channel the arc fault discharge to any portion of circuit breaker 200 that enables circuit breaker 200 to operate as described herein.

Interrupter 206 is configured to selectively prevent a flow of electrical current through circuit breaker 200. Interrupter 206 is also configured to move between a first position 238 and a second position 240 (shown in ghost in FIG. 3), wherein first position 238 prevents a flow of electrical current through circuit breaker 200 and second position 240 allows a flow of electrical current through circuit breaker 200. Arc protection mechanism 216 is configured to receive the arc fault discharge and to trip interrupter mechanism 208 to cause interrupter 206 to move to first position 238 in response to the arc fault discharge. Interrupter mechanism 208 is coupled to housing 210 and interrupter 206, and is configured to move interrupter 206 between first position 238 and second position 240. In alternative embodiments, interrupter mechanism 208 and arc protection mechanism 216 are configured in any manner that enables circuit breaker 200 to operate as described herein.

In the exemplary embodiment, interrupter mechanism 208 and arc protection mechanism 216 are configured to operate without a triggering circuit or electrical input, and without any potential response delay associated with a triggering circuit. More specifically, interrupter mechanism 208 and arc protection 216 function using stored mechanical energy and the force from impinging arc fault discharge. The mechanical energy is in the form of potential energy at least partially stored by interrupter mechanism spring 236 and arc protection mechanism spring 232. In the exemplary embodiment, arc protection mechanism 216 includes a trip cam 218 that is configured to receive the arc fault discharge, wherein the impinging arc fault discharge causes a movement in trip cam 218 sufficient to release the potential energy stored in arc protection mechanism spring 232 and activate arc protection mechanism 216. Following activation of arc protection mechanism 216 by the impinging arc fault discharge, arc protection mechanism 216 trips and/or activates interrupter mechanism 208, releasing the potential energy stored in interrupter mechanism spring 236 to cause circuit breaker 200 to extinguish the arc fault. In alternative embodiments, interrupter mechanism 208 and arc protection mechanism 216 operate in any manner that enables circuit breaker 200 to function as described herein.

More specifically, following activation of arc protection mechanism 216 in the exemplary embodiment, an arc protection mechanism coupler arm 230 rotates and causes interrupter mechanism linkage 228 to both translate and rotate. Interrupter mechanism linkage 228 in turn causes an interrupter mechanism lever shaft 226 to rotate with the assistance of interrupter mechanism spring 236. Lever shaft 226 is coupled to an insulated coupling rod 220 which is coupled to interrupter 206. As lever shaft 226 is caused to rotate by interrupter mechanism 208, coupling rod 220 and interrupter 206 are caused to move within the body of housing 210 between second position 240 and first position 238. In alternative embodiments, the components of circuit breaker 200 are configured in any way that enables circuit breaker 200 to operate as described herein.

Figure 4:
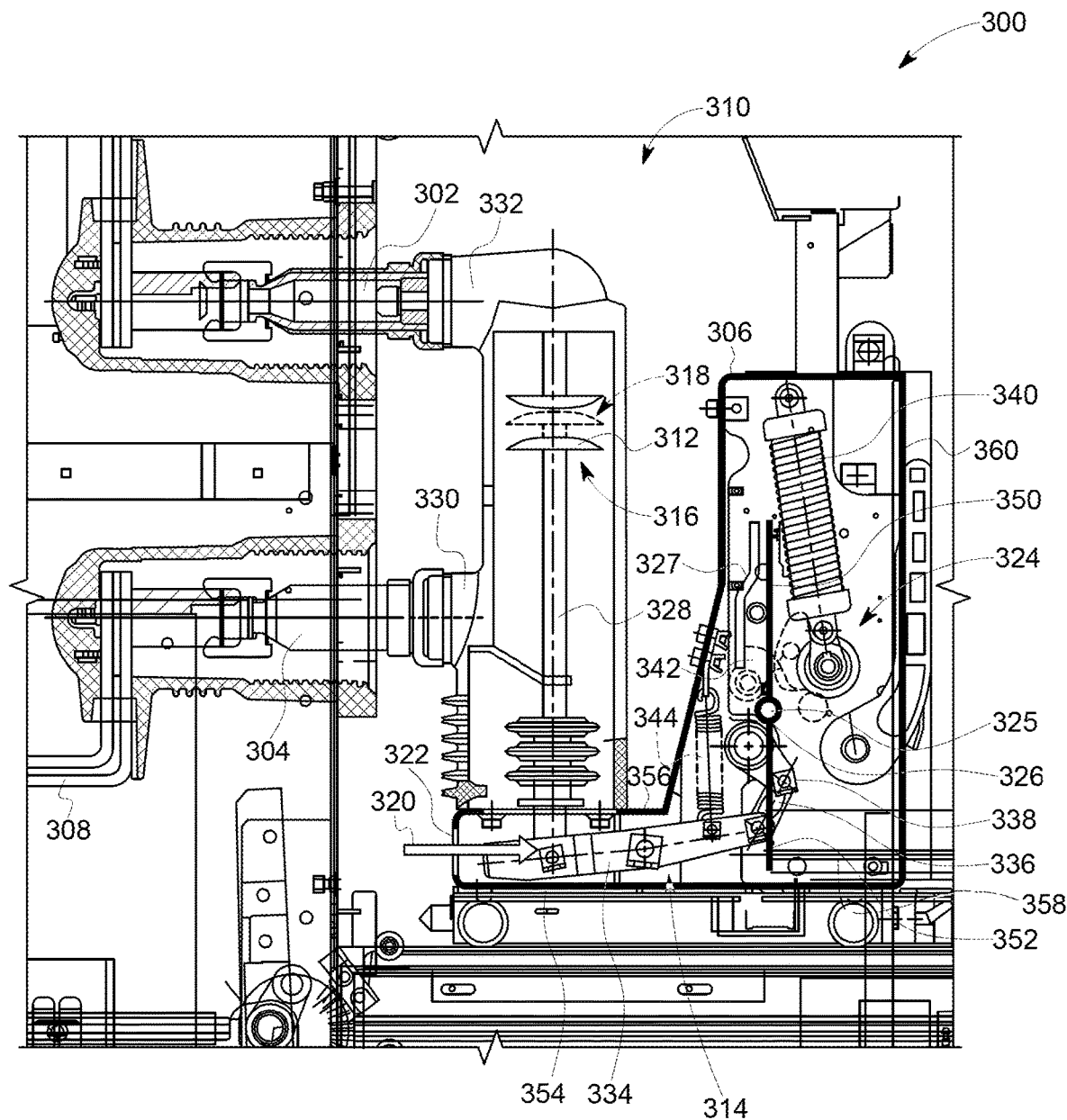
FIG. 4 is a schematic diagram of another exemplary embodiment of a circuit breaker that may be used with the arc protection system shown in FIG. 2.

FIG. 4 is a schematic diagram of another exemplary embodiment of a circuit breaker 300 that may be used with arc protection system 105 shown in FIG. 2. In the exemplary embodiment, circuit breaker 300 is a vacuum circuit breaker. Alternatively, circuit breaker 300 may be any other type of circuit breaker, including, without limitation, an air circuit breaker, a sulfur hexafluoride circuit breaker, and a carbon dioxide circuit breaker. In the exemplary embodiment, circuit breaker 300 is coupled to and between two sets of electrical power lines, including at least one load side power line 302 and at least one line side power line 304. Further, in the exemplary embodiment, load side power line 302 is coupled to at least one electrical component 112 (shown in FIG. 1), and line side power line 304 is coupled to at least one electrical power source 308 including, without limitation, an AC power generator or a DC power supply. Circuit breaker 300 includes any components that enable circuit breaker 300 to operate as described herein. For example, in some embodiments, circuit breaker 300 includes a load strap (not shown), a line strap (not shown), a rotor assembly (not shown), and an operating mechanism (not shown).

Further, in the exemplary embodiment, circuit breaker 300 includes an interrupter 312 and an assembly 310. Interrupter 312 is configured to selectively prevent a flow of electrical current through circuit breaker 300. Interrupter 312 is also configured to move between a first position 316 and a second position 318 (shown in ghost in FIG. 3), wherein first position 316 prevents a flow of electrical current through circuit breaker 300 and second position 318 allows a flow of electrical current through circuit breaker 300. Assembly 310 includes a housing 306, an interrupter mechanism 314, and an arc protection mechanism 324. Housing 306 defines a vent path 320 formed in housing 306 and including an opening 322 configured to channel at least a portion of the arc fault discharge generated during an arc fault into housing 306. Vent path 320 is defined between a pair of housing sidewalls 358, a housing upper wall 356, a housing lower wall 354, and a housing back wall 360. The arc fault discharge entering vent path 320 through opening 322 is constrained by sidewalls 358, upper wall 356, and lower wall 354, and directed to make contact with back wall 360. The arc fault discharge is then redirected by back wall 360 towards arc protection mechanism 324. In alternative embodiments, vent path 320 is configured to channel the arc fault discharge to any portion of circuit breaker 300 that enables circuit breaker 300 to operate as described herein.

In the exemplary embodiment, arc protection mechanism 324 is configured to receive the arc fault discharge and to trip interrupter mechanism 314 to cause interrupter 312 to move to first position 316 in response to the arc fault discharge. Interrupter mechanism 314 is coupled to housing 306 and interrupter 312, and is configured to move interrupter 312 between first position 316 and second position 318. In alternative embodiments, interrupter mechanism 314 and arc protection mechanism 324 are configured in any manner that enables circuit breaker 300 to operate as described herein.

In the exemplary embodiment, interrupter mechanism 314 and arc protection mechanism 324 are configured to operate without a triggering circuit or electrical input, and without any potential response delay associated with a triggering circuit. More specifically, interrupter mechanism 314 and arc protection mechanism 324 function using stored mechanical energy and the force from impinging arc fault discharge. In the exemplary embodiment, the stored mechanical energy is in the form of potential energy at least partially stored by interrupter mechanism spring 344 and arc protection mechanism spring 340. In the exemplary embodiment, arc protection mechanism 324 includes a trip lever 326 positioned in vent path 320 and configured to receive the arc fault discharge, wherein the impinging arc fault discharge causes trip lever 326 to rotate about a trip lever pivot point 325. When trip lever 326 is caused to rotate about trip lever pivot point 325, an upper portion 350 of trip lever 326 contacts a trip arm 327 that acts as a lever arm for a trip cam 342. Trip arm 327 causes movement in trip cam 342 sufficient to release the potential energy stored in arc protection mechanism spring 340 and activate arc protection mechanism 324. Following activation of arc protection mechanism 324 by the impinging arc fault discharge, arc protection mechanism 324 trips and/or activates interrupter mechanism 314, releasing the potential energy stored in interrupter mechanism spring 344 to cause circuit breaker 300 to extinguish the arc fault. In alternative embodiments, interrupter mechanism 314 and arc protection mechanism 324 operate in any manner that enables circuit breaker 300 to function as described herein.

More specifically, following activation of arc protection mechanism 324 in the exemplary embodiment, an arc protection mechanism coupler arm 338 rotates and causes interrupter mechanism linkage 336 to both translate and rotate. Interrupter mechanism linkage 336 in turn causes an interrupter mechanism lever shaft 334 to rotate with the assistance of interrupter mechanism spring 344. Lever shaft 334 is coupled to an insulated coupling rod 328 which is coupled to interrupter 312. As lever shaft 334 is caused to rotate by interrupter mechanism 314, coupling rod 328 and interrupter 312 are caused to move within the body of housing 306 between first position 316 and second position 318. In alternative embodiments, the components of circuit breaker 300 are configured in any way that enables circuit breaker 300 to operate as described herein.

Figure 5:
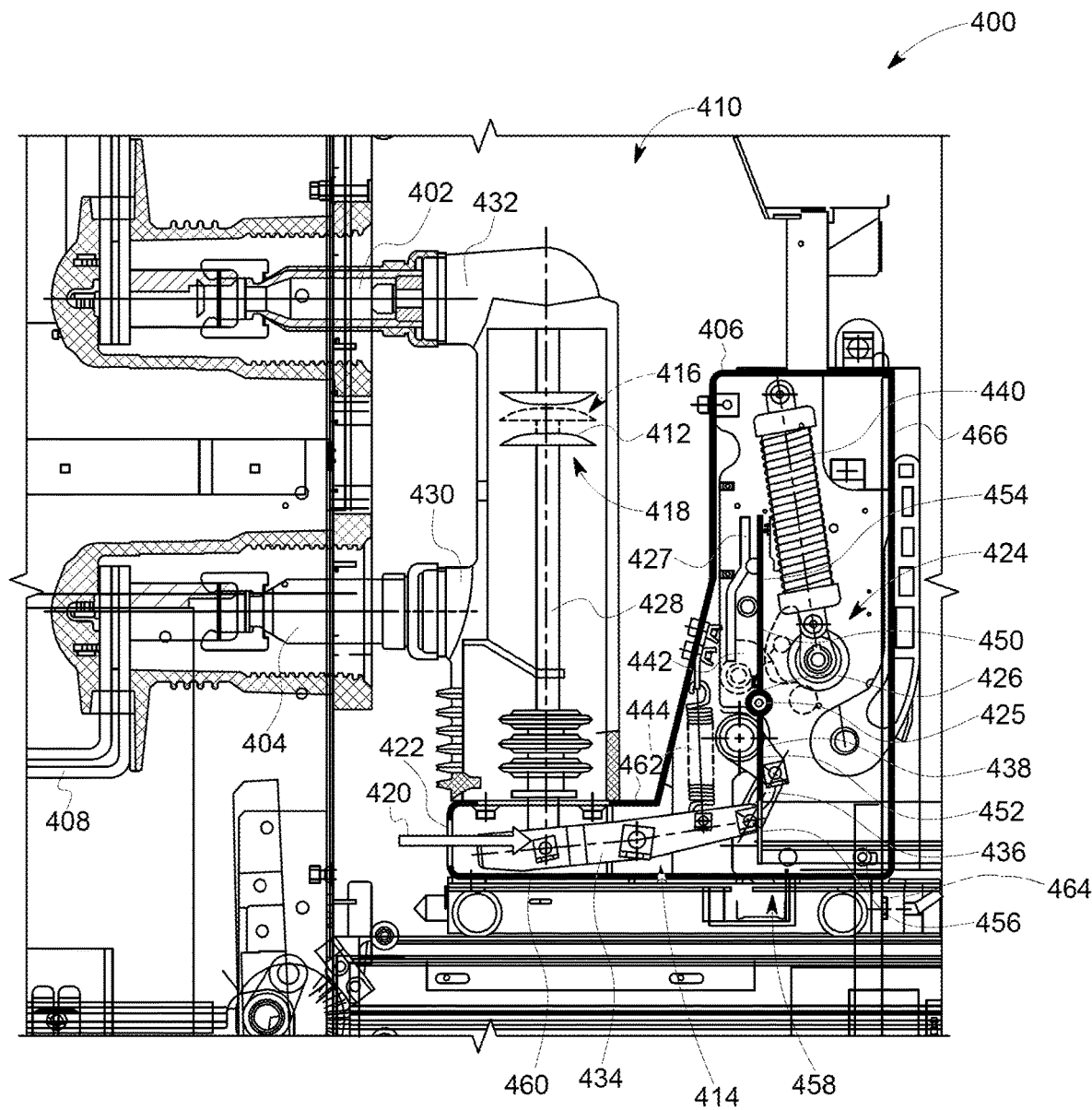
FIG. 5 is a schematic diagram of another exemplary embodiment of a circuit breaker that may be used with the arc protection system shown in FIG. 2.

FIG. 5 is a schematic diagram of another exemplary embodiment of a circuit breaker 400 that may be used with arc protection system 105 shown in FIG. 2. In the exemplary embodiment, circuit breaker 400 is a vacuum circuit breaker. Alternatively, circuit breaker 400 may be any other type of circuit breaker, including, without limitation, an air circuit breaker, a sulfur hexafluoride circuit breaker, and a carbon dioxide circuit breaker. In the exemplary embodiment, circuit breaker 400 is coupled to and between two sets of electrical power lines including at least one load side power line 402 and at least one line side power line 404. Further, in the exemplary embodiment, load side power line 402 is coupled to at least one electrical component 112 (shown in FIG. 1), and line side power line 404 is coupled to at least one electrical power source 408 including, without limitation, an AC power generator or a DC power supply. Circuit breaker 400 includes any components that enable circuit breaker 400 to operate as described herein. For example, in some embodiments, circuit breaker 400 includes a load strap (not shown), a line strap (not shown), a rotor assembly (not shown), and an operating mechanism (not shown).

Further, in the exemplary embodiment, circuit breaker 400 includes an interrupter 412 and an assembly 410. Interrupter 412 is configured to selectively prevent a flow of electrical current through circuit breaker 400. Interrupter 412 is also configured to move between a first position 416 and a second position 418 (shown in ghost in FIG. 3), wherein first position 416 prevents a flow of electrical current through circuit breaker 400 and second position 418 allows a flow of electrical current through circuit breaker 400. Assembly 410 includes a housing 406, an interrupter mechanism 414, and an arc protection mechanism 424. Housing 406 defines a vent path 420 formed in housing 406 and including an opening 422 configured to channel at least a portion of the arc fault discharge generated during an arc fault into housing 406. Vent path 420 is defined between a pair of sidewalls 464, an upper wall 462, a lower wall 460 and a back wall 466. The arc fault discharge entering vent path 420 through opening 422 is constrained by pair of sidewalls 464, upper wall 462, and lower wall 460, and is directed to make contact with back wall 466. The arc fault discharge is then redirected by back wall 466 towards arc protection mechanism 424. In alternative embodiments, vent path 420 is configured to channel the arc fault discharge to any portion of circuit breaker 400 that enables circuit breaker 400 to operate as described herein.

In the exemplary embodiment, arc protection mechanism 424 is configured to receive the arc fault discharge and to trip interrupter mechanism 414 to cause interrupter 412 to move to first position 416 in response to the arc fault discharge. Interrupter mechanism 414 is coupled to housing 406 and interrupter 412, and is configured to move interrupter 412 between first position 416 and second position 418. In alternative embodiments, interrupter mechanism 414 and arc protection mechanism 424 are configured in any manner that enables circuit breaker 400 to operate as described herein.

In the exemplary embodiment, interrupter mechanism 414 and arc protection mechanism 424 are configured to operate without a triggering circuit or electrical input, and without any potential response delay associated with a triggering circuit. More specifically, interrupter mechanism 414 and arc protection mechanism 424 function using stored mechanical energy and the force from an impinging arc fault discharge. In the exemplary embodiment, the stored mechanical energy is in the form of potential energy at least partially stored by interrupter mechanism spring 444 and arc protection mechanism spring 440. In the exemplary embodiment, arc protection mechanism 424 includes a trip lever 426 positioned in vent path 420 and configured to receive the arc fault discharge, wherein the impinging arc fault discharge causes trip lever 426 to rotate about a trip lever pivot point 425. In the exemplary embodiment, trip lever 426 includes a first portion 454 and a second portion 456, wherein second portion 456 has a predetermined flexibility and is configured to be releasably retained by a restraint 458 that is coupled to assembly 410. In the exemplary embodiment, restraint 458 includes a set of rigid walls coupled to assembly 410 that inhibit movement of second portion 456 until second portion 456 has deformed, in response to the impinging arc fault discharge, by an amount that allows second portion 456 to pass outside of restraint 458. In alternative embodiments, interrupter mechanism 414 and arc protection mechanism 424 operate in any manner that enables circuit breaker 400 to function as described herein.

More specifically, following activation of arc protection mechanism 424, an arc protection mechanism coupler arm 438 rotates and causes interrupter mechanism linkage 436 to both translate and rotate. Interrupter mechanism linkage 436 in turn causes an interrupter mechanism lever shaft 434 to rotate with the assistance of interrupter mechanism spring 444. Lever shaft 434 is coupled to an insulated coupling rod 428 which is coupled to interrupter 412. As lever shaft 434 is caused to rotate by interrupter mechanism 414, coupling rod 428 and interrupter 412 are caused to move within the body of housing 406 between first position 416 and second position 418. In alternative embodiments, the components of circuit breaker 400 are configured in any way that enables circuit breaker 400 to operate as described herein.

In the exemplary embodiment, second portion 456 and restraint 458 are configured to facilitate reducing false activations of arc protection mechanism 424. The motion of trip lever 426 is constrained until a certain force resulting from the impingement of the arc fault discharge on lower portion 452 is sufficient to deform second portion 456 such that trip lever 426 is released from restraint 458 and is able to rotate about pivot point 425. In at least some embodiments, the predetermined flexibility of second portion 456 is configured to induce in arc protection mechanism 424 at least one of a vibration resistance, a seismic movement resistance, an inclination resistance, and a time delay. In alternative embodiments, restraint 458 and the predetermined flexibility of second portion 456 are configured in any manner that enables circuit breaker 400 to function as described herein.

When trip lever 426 is caused to rotate about trip lever pivot point 425, an upper portion 450 of trip lever 426 contacts a trip arm 427 that acts as a lever arm for a trip cam 442. Trip arm 427 causes movement in trip cam 442 sufficient to release the potential energy stored in arc protection mechanism spring 440 and activate arc protection mechanism 424. Following activation of arc protection mechanism 424 by the impinging arc fault discharge, arc protection mechanism 424 trips and/or activates interrupter mechanism 414, releasing the potential energy stored in interrupter mechanism spring 444 to cause circuit breaker 400 to extinguish the arc fault. In alternative embodiments, trip lever 426 and trip arm 427 move in any manner that enables arc protection mechanism 424 to operate as described herein.

Figure 6:
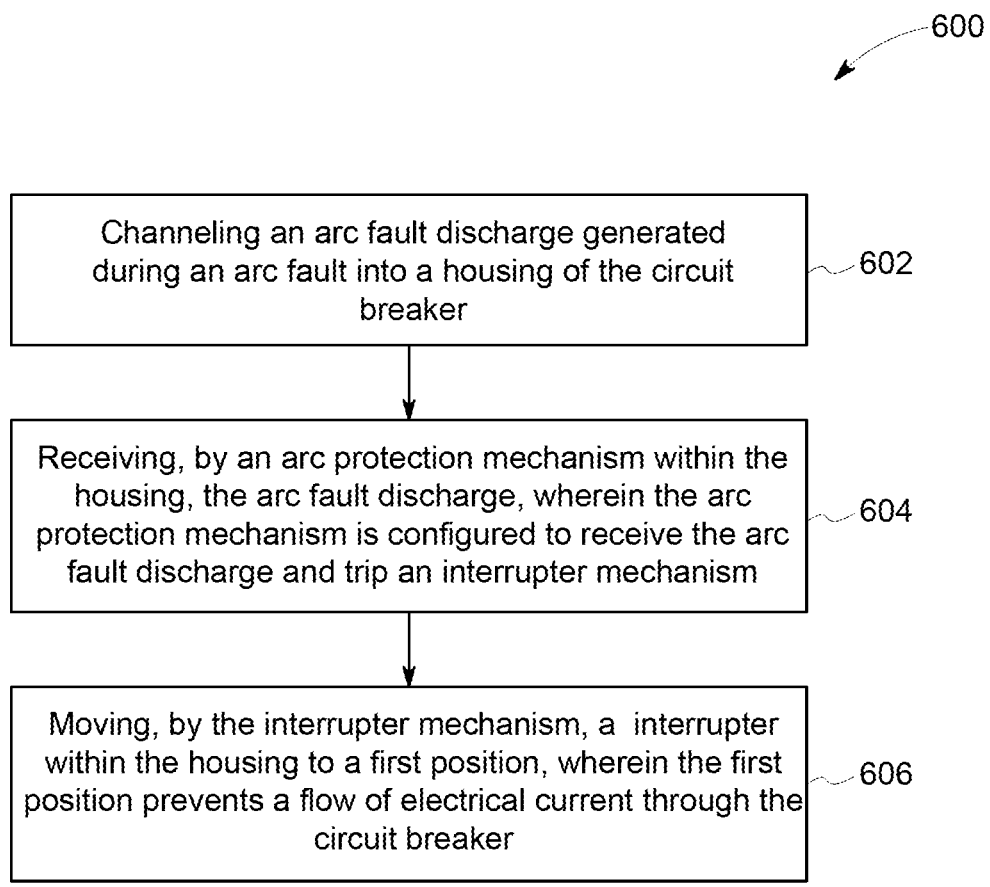
FIG. 6 is a flowchart of an exemplary method of extinguishing an arc from an arc fault occurring in an interior of an electrical enclosure with a circuit breaker that may be used with the arc protection system shown in FIG. 2.

FIG. 6 is a flowchart of an exemplary method 600 of extinguishing an arc from an arc fault occurring in an interior of an electrical enclosure (e.g. switchgear enclosure 100) with a circuit breaker (e.g., circuit breaker 200) that may be used with the arc protection system shown in FIG. 2. Method 600 includes channeling 602 an arc fault discharge generated during an arc fault into a vent path (e.g., vent path 214) of an assembly (e.g., assembly 205). Method 600 also includes receiving 604 the arc fault discharge, using an arc protection mechanism (e.g., arc protection mechanism 216), wherein the arc protection mechanism is configured to receive the arc fault discharge and trip an interrupter mechanism (e.g., interrupter mechanism 208). Method 600 further includes moving 606, using the interrupter mechanism, an interrupter (e.g., interrupter 206) within a housing (e.g., housing 210) to a first position (e.g., first position 238), wherein the first position prevents a flow of electrical current through the circuit breaker.

The circuit breakers described above generally include an interrupter enclosure including an interrupter configured to selectively prevent a flow of electrical current through the circuit breaker. The circuit breaker includes an assembly that includes an interrupter mechanism, a vent path, and an arc protection mechanism configured to trip the interrupter mechanism to actuate the interrupter. The circuit breaker can operate without the need for an electrical triggering circuit. In further embodiments, the arc protection mechanism includes a trip cam configured to receive an arc fault discharge from the vent path within the housing and configured to activate the arc protection mechanism. In other suitable embodiments, the arc protection mechanism includes a trip lever configured to receive the arc fault discharge from the vent path and configured to activate the arc protection mechanism. In some embodiments, the trip lever has a first portion, and a second portion having a predetermined flexibility, the flexible portion configured to be releasably retained within a restraint coupled to the assembly. Also, in some embodiments, the flexible portion of the trip lever is configured to induce in the arc protection mechanism at least one of a vibration resistance, a seismic movement resistance, an inclination resistance, and a time delay.

An exemplary technical effect of the methods, systems, and apparatus described herein includes at least one of: (a) rapidly stopping arc faults in electrical components such as switchgear in AC power systems; (b) mitigating or preventing undesirable effects of arcs in switchgear; (c) increasing reliability of operating mechanisms of circuit breakers; (d) enabling effective active arc control in switchgear at a lower level of complexity and cost relative to known active arc controllers; (e) reducing response time for the circuit breaker without the need for an electrical circuit, and (f) increasing the IAC rating of low-, medium-, and high-voltage switchgear in both DC and AC power systems applications.

Exemplary embodiments of circuit breakers and methods of using circuit breakers are described above in detail. The circuit breakers and methods are not limited to the specific embodiments described herein but, rather, components of the circuit breakers and/or operations of the methods may be utilized independently and separately from other components and/or operations described herein. Further, the described components and/or operations may also be defined in, or used in combination with, other systems, methods, and/or devices, and are not limited to practice with only the circuit breakers and systems described herein.

The order of execution or performance of the operations in the embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit breaker for an arc protection system, the circuit breaker comprising:
   an interrupter configured to selectively prevent a flow of electrical current through the circuit breaker;
   a housing including an opening;
   an interrupter mechanism coupled to the housing and the interrupter, the interrupter mechanism configured to move the interrupter between a first position in which the interrupter prevents the flow of electrical current through the circuit breaker and a second position in which the interrupter permits the flow of electrical current through the circuit breaker; and
   an arc protection mechanism within the housing, wherein the housing opening is positioned to allow an arc fault discharge generated during an arc fault to pass into the housing and to the arc protection mechanism, and wherein the arc protection mechanism is configured to cause the interrupter to move to the first position in response to the arc fault discharge.

2. The circuit breaker of claim 1, further comprising:
   a vent path defined in the housing by a pair of sidewalls, an upper wall, a lower wall, and a back wall, wherein the vent path is arranged for the arc fault discharge to enter the vent path through the opening in the housing, pass between the pair of sidewalls, the lower wall, and the upper wall, and contact the back wall to direct the arc fault discharge towards the arc protection mechanism.

3. The circuit breaker of claim 1, wherein the interrupter mechanism and the arc protection mechanism are configured to operate without an electrical input.

4. The circuit breaker of claim 3, wherein the circuit breaker comprises a vacuum circuit breaker.

5. The circuit breaker of claim 3, wherein the arc protection mechanism comprises a trip cam configured to receive the arc fault discharge.

6. The circuit breaker of claim 3, wherein the arc protection mechanism comprises a trip lever, wherein at least a portion of the trip lever is positioned to receive the arc fault discharge in the housing, the trip lever configured to be activated in response to receiving the arc fault discharge and to activate the arc protection system.

7. The circuit breaker of claim 6, wherein the trip lever has a first portion and a second portion, the second portion having a predetermined flexibility and configured to be releasably retained by a restraint coupled to the housing, wherein at least a portion of the first portion is positioned in the housing to receive the arc fault discharge.

8. The circuit breaker of claim 7, wherein the predetermined flexibility of the second portion is configured to induce in the arc protection mechanism at least one of a vibration resistance, a seismic movement resistance, an inclination resistance, and a time delay.

9. An arc protection system for an electrical enclosure, the electrical enclosure including a breaker compartment and a cable compartment, the arc protection system comprising:
   a load side power line coupled to at least one electrical component;
   a line side power line coupled to at least one electrical power source; and
   a circuit breaker coupled to the load side power line and the line side power line, the circuit breaker comprising:
      an interrupter configured to selectively prevent a flow of electrical current through the circuit breaker;
      a housing including an opening;
      an interrupter mechanism coupled to the housing and the interrupter, the interrupter mechanism configured to move the interrupter between a first position in which the interrupter prevents the flow of electrical current through the circuit breaker and a second position in which the interrupter permits the flow of electrical current through the circuit breaker; and
      an arc protection mechanism within the housing, wherein the housing opening is positioned to allow an arc fault discharge generated during an arc fault to pass into the housing and to the arc protection mechanism, and wherein the arc protection mechanism is configured to cause the interrupter to move to the first position in response to the arc fault discharge.

10. The arc protection system of claim 9, further comprising:
    a vent path defined in the housing by a pair of sidewalls, an upper wall, a lower wall, and a back wall, wherein the vent path is arranged for the arc fault discharge to enter the vent path through the opening in the housing, pass between the pair of sidewalls, the lower wall, and the upper wall, and contact the back wall to direct the arc fault discharge towards the arc protection mechanism.

11. The arc protection system of claim 9, wherein the interrupter mechanism and the arc protection mechanism are configured to operate without an electrical input.

12. The arc protection system of claim 11, wherein the circuit breaker comprises a vacuum circuit breaker.

13. The arc protection system of claim 11, wherein the arc protection mechanism further comprises a trip cam configured to receive the arc fault discharge.

14. The arc protection system of claim 11, wherein the arc protection mechanism comprises a trip lever, wherein at least a portion of the trip lever is positioned to receive the arc fault discharge in the housing, the trip lever configured to be activated in response to receiving the arc fault discharge and to activate the arc protection system.

15. The arc protection system of claim 14, wherein the trip lever has a first portion and a second portion, the second portion having a predetermined flexibility and configured to be releasably retained by a restraint coupled to the housing, wherein at least a portion of the first portion is positioned in the housing to receive the arc fault discharge.

16. The arc protection system of claim 15, wherein the predetermined flexibility of the second portion is configured to induce in the arc protection mechanism at least one of a vibration resistance, a seismic movement resistance, an inclination resistance, and a time delay.

17. The arc protection system of claim 15, wherein a portion of the cable compartment is configured to deform during the arc fault to channel the arc fault discharge from the cable compartment to the opening of the housing.

18. A method of extinguishing an arc from an arc fault occurring in an interior of an electrical enclosure with a circuit breaker, the method comprising:
    channeling an arc fault discharge generated during the arc fault into a housing of the circuit breaker;
    receiving, by an arc protection mechanism within the housing, the arc fault discharge, wherein the arc protection mechanism is configured to receive the arc fault discharge and trip an interrupter mechanism in response; and
    moving, by the interrupter mechanism, an interrupter within the housing to a first position in which the interrupter prevents a flow of electrical current through the circuit breaker.

19. The method of claim 18, wherein moving the interrupter does not require electrical input.

20. The method of claim 19, wherein receiving the arc fault discharge comprises receiving the arc fault discharge using a trip cam.

* * * * *